United States Patent
Hammond

(10) Patent No.: US 6,168,816 B1
(45) Date of Patent: Jan. 2, 2001

(54) BEVERAGE INFUSER

(75) Inventor: Cris Hammond, Sausalito, CA (US)

(73) Assignee: Chris Hammond, Sausalito, CA (US)

( * ) Notice: Under 35 U.S.C. 154(b), the term of this patent shall be extended for 0 days.

(21) Appl. No.: 09/199,612

(22) Filed: Nov. 25, 1998

Related U.S. Application Data

(60) Provisional application No. 60/076,835, filed on Mar. 4, 1998, and provisional application No. 60/066,817, filed on Nov. 26, 1997.

(51) Int. Cl.⁷ .............................. A23F 5/00; A23F 3/00; B65B 29/02
(52) U.S. Cl. .................... 426/433; 426/80; 426/82; 426/435; 426/77
(58) Field of Search ................... 426/433, 435, 426/82, 80, 77

(56) References Cited

U.S. PATENT DOCUMENTS

| | | |
|---|---|---|
| 323,780 | 8/1885 | Brown . |
| D. 343,759 | 2/1994 | Jorgensen ............... D7/318 |
| D. 380,535 | 7/1997 | Joergensen ............. D22/365 |
| 1,098,799 | 6/1914 | Higdon . |
| 1,168,544 | 1/1916 | Newlin . |
| 1,268,858 | 6/1918 | Lewis . |
| 1,572,861 | 7/1926 | Larrey . |
| 1,767,915 | 6/1930 | Bugg . |
| 1,797,672 | 3/1931 | Paolini . |
| 1,873,023 | 8/1932 | Peirce . |
| 1,887,846 | 5/1932 | Peirce . |
| 1,984,047 | 12/1934 | Thieme ............................ 53/3 |
| 2,093,980 | 9/1937 | Linger ............................. 53/3 |
| 2,338,251 | 1/1944 | Makino ........................ 99/322 |
| 2,401,529 | 6/1946 | Varney et al. ............... 99/279 |
| 2,728,671 | 12/1955 | Young et al. ................ 99/77.1 |
| 2,808,775 | 10/1957 | Schott . |
| 3,158,084 | 11/1964 | Cohn ........................... 99/297 |
| 3,174,424 | 3/1965 | Serio ........................... 99/299 |
| 3,324,787 | 6/1967 | McCleary .................... 99/319 |
| 3,339,476 | 9/1967 | Troya ........................... 99/287 |
| 3,413,908 | 12/1968 | Nadelson ..................... 99/297 |
| 3,592,126 | 7/1971 | Dombrowlk ................. 99/312 |
| 3,669,694 | 6/1972 | Nauheimer et al. ......... 99/310 |
| 3,755,895 | * 9/1973 | Claasen . |
| 3,861,284 | 1/1975 | Costello ....................... 99/321 |
| 3,935,318 | 1/1976 | Mihailide ..................... 426/80 |
| 4,365,544 | 12/1982 | Howitt ......................... 99/297 |
| 4,785,723 | 11/1988 | Sheen .......................... 99/279 |
| 4,828,850 | 5/1989 | Davis ........................... 426/77 |
| 4,864,921 | 9/1989 | Ross ............................. 99/279 |
| 4,981,588 | 1/1991 | Poulallion ................... 210/474 |
| 5,059,325 | 10/1991 | Iida ............................. 210/474 |
| 5,076,425 | 12/1991 | Plone .......................... 206/220 |
| 5,367,946 | 11/1994 | Yasunaga ..................... 99/286 |
| 5,453,189 | 9/1995 | Joergensen .................. 210/238 |
| 5,461,968 | 10/1995 | Portman ...................... 99/287 |
| 5,478,586 | 12/1995 | Connor ........................ 426/431 |
| 5,618,570 | 4/1997 | Banks et al. ................. 426/435 |
| 5,632,193 | 5/1997 | Shen ............................ 99/285 |
| 5,657,898 | 8/1997 | Portman et al. ............. 220/712 |
| 5,937,737 | * 8/1999 | Karell ........................... 99/287 |

FOREIGN PATENT DOCUMENTS

| | | |
|---|---|---|
| 548225 | 11/1959 | (BE) . |
| 554405 | 1/1960 | (BE) . |
| 2551899 | 2/1977 | (DE) . |
| 1196574 | 11/1959 | (FR) . |
| 3719 | 9/1906 | (GB) . |
| 297244 | 9/1928 | (GB) . |
| 314445 | 4/1930 | (GB) . |
| 673081 | 6/1952 | (GB) . |
| 755614 | 8/1953 | (GB) . |
| 1482293 | 8/1977 | (SE) . |

* cited by examiner

Primary Examiner—Anthony J Weier
(74) Attorney, Agent, or Firm—Limbach & Limbach LLP

(57) ABSTRACT

A beverage infuser includes a cap that is attachable to a drinking cup and that includes a drinking port, and a strainer basket attachable to the cap. The strainer basket is configured to hold loose tea leaves, or coffee grounds etc. and includes a position in which it is suspended into the cup when the cap and strainer basket are attached to one another.

5 Claims, 6 Drawing Sheets

BEVERAGE INFUSER

This claims the benefit to U.S. Provisional Application Serial No. 60/076835, filed Mar. 4, 1998 and U.S. Provisional Application Serial No. 60/066817, filed Nov. 26, 1997.

FIELD OF THE INVENTION

The present invention relates generally to the field of beverage containers and specifically to a beverage infuser suitable for use in a beverage cup.

BACKGROUND OF THE INVENTION

A popular practice for many individuals is to drink beverages while travelling, such as in the car, on the bus, ferry, train etc., or while walking. These beverages are prepared at home or purchased at a shop or kiosk selling carry out beverages. Many varieties of disposable and non-disposable beverage containers are available for these purposes.

Many tea drinkers favor freshly brewed tea made from loose tea leaves. Brewing loose tea requires steeping the tea leaves in hot water for a desired period of time that is typically around two minutes. During steeping, the tea leaves are normally held in a basket or strainer suspended in a tea pot which is filled with hot water. Once the steeping period has ended, the brewed tea is poured into a separate cup for consumption.

For this reason, tea drinkers purchasing "carry out" tea drinks must typically remain in the store until steeping is completed and the tea has been transferred into a beverage cup. Likewise, tea drinkers preparing their tea at home must remain at home during the steeping process. Until now, the only alternative carry-out option for tea drinkers has been the use of pre-packaged tea bags which are suspended into the hot water in the beverage cup and then discarded at the end of the steeping period. For tea drinkers preferring the flavor of tea made from loose leaves, this alternative is undesirable.

The object of the present invention is to provide a beverage container configured for brewing loose tea leaves without the use of a pre-packaged tea bag.

SUMMARY OF THE INVENTION

The present invention is a beverage infuser particularly suitable for use on individual drinking cups, including disposable cups of the type commonly used for carry-out beverages.

The beverage infuser is preferably used for making tea using bulk tea leaves, although it is also suitable for use with tea bags or for other beverages, including coffee.

BRIEF DESCRIPTION OF THE DRAWINGS

A first embodiment of a beverage infuser according to the present invention is shown in FIGS. 1 through 6, in which.

Figure 7B:
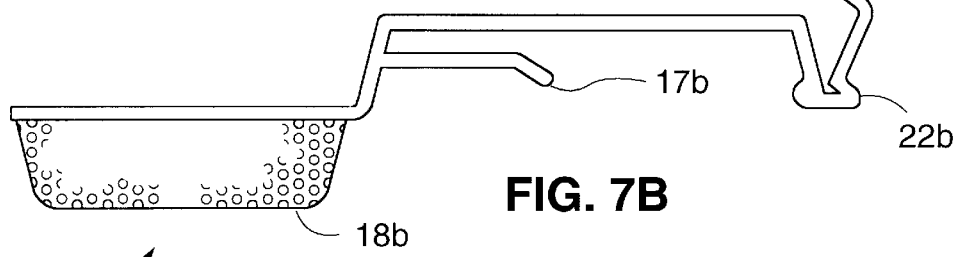
Figure 7A:
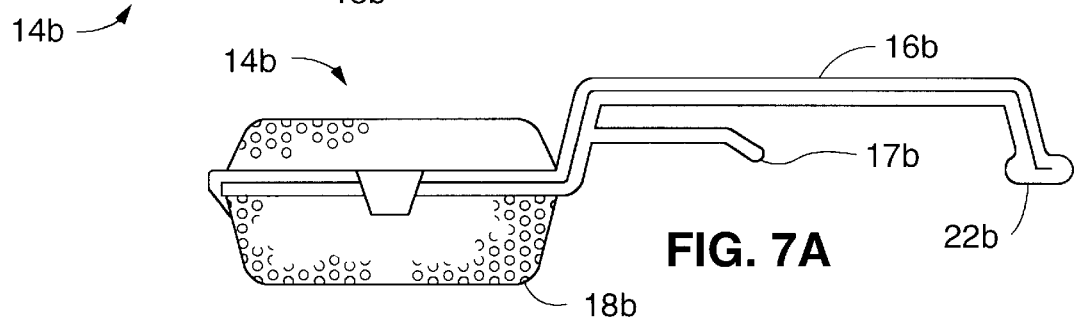
Figure 8:
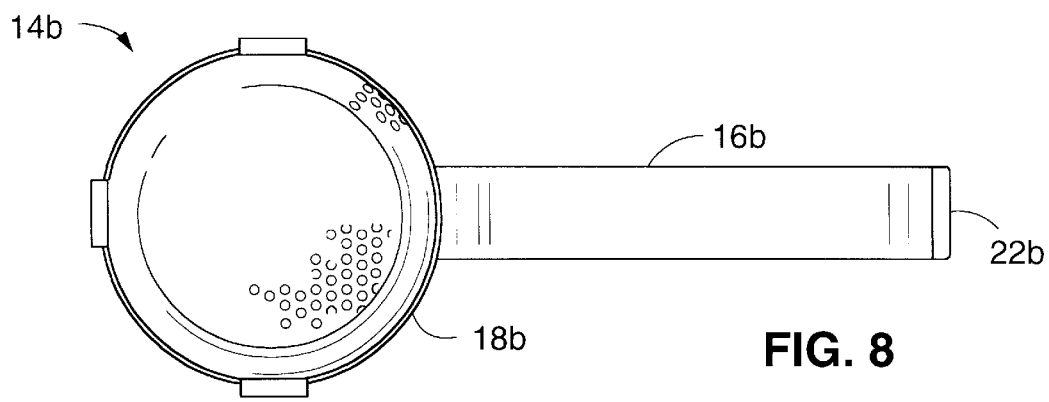

A second embodiment of a beverage infuser according to the present invention is shown in FIGS. 7A–8, in which:

FIG. 7A is a side elevation view of a strainer assembly of a beverage infuser according to the second embodiment;

FIG. 7B is a side elevation view of the strainer assembly of FIG. 7A showing the strainer basket in the opened position; and FIG. 8 is a top plan view of the strainer assembly of FIG. 7A.

Figure 9:
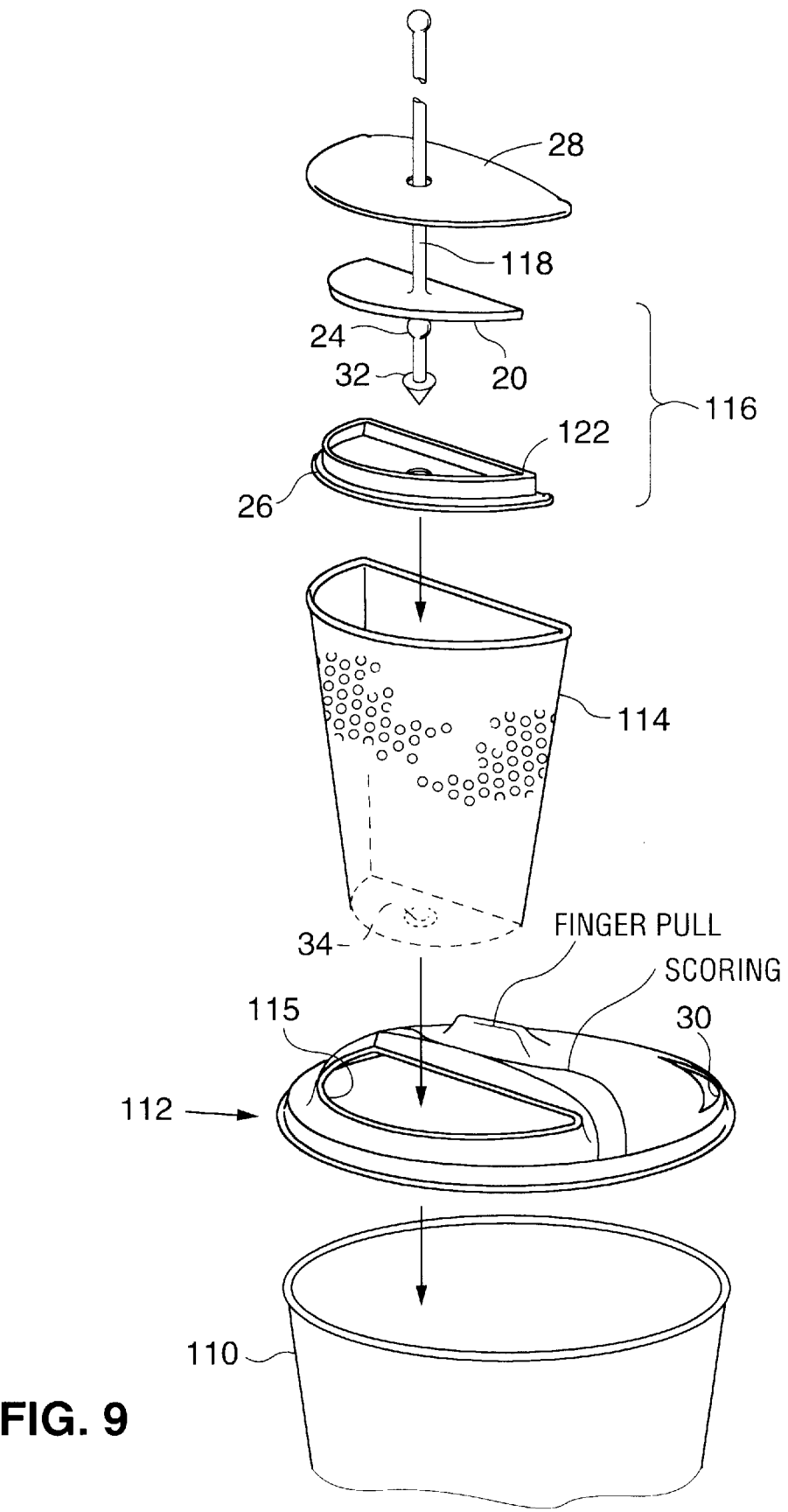

A third embodiment of a beverage infuser according to the present invention is shown in FIGS. 9 through 14, in which:

FIG. 9 is an exploded perspective view of a beverage container having an infuser according to the third embodiment.

Figure 10:
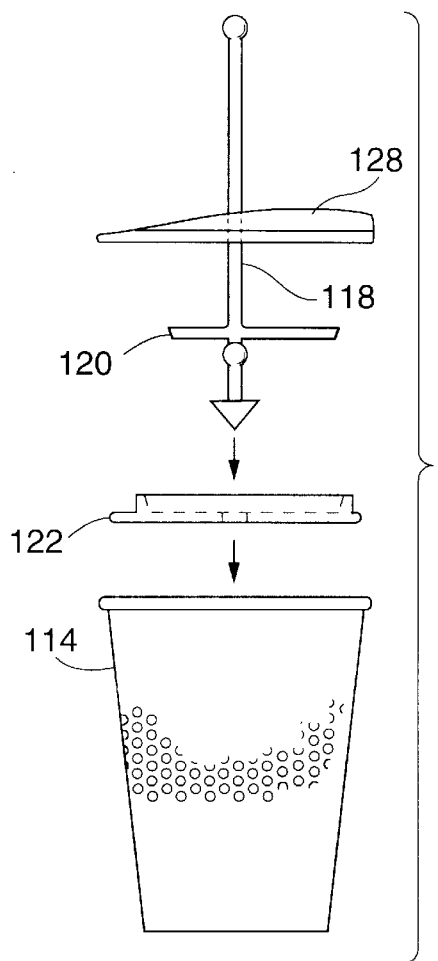

FIG. 10 is an exploded side elevation view of the infuser of FIG. 9.

Figure 11:
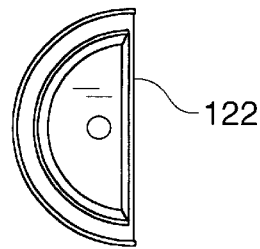

FIG. 11 is a top view of the plunger portion of the infuser of FIG. 9.

Figure 12:
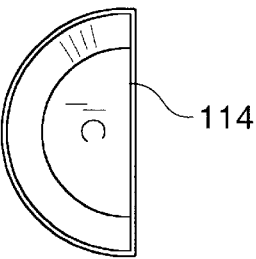

FIG. 12 is a top view of the strainer of the infuser of FIG. 9.

Figure 13:
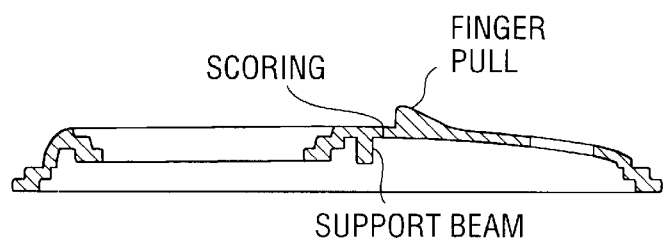

FIG. 13 is a cross-section view of the cap portion of the infuser of FIG. 9.

Figure 14:
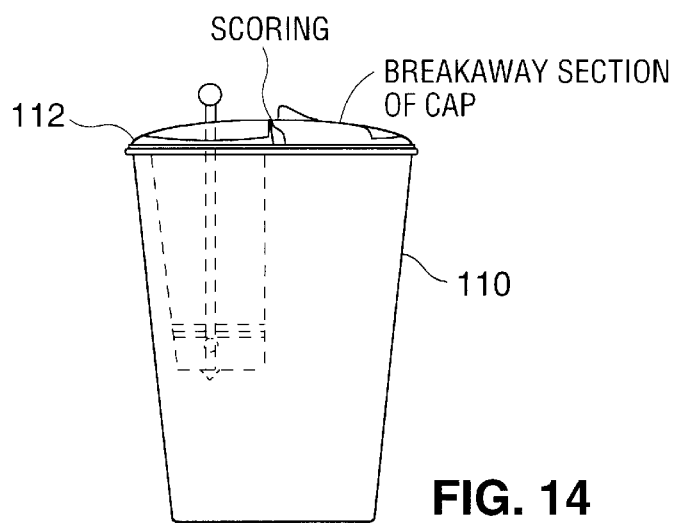

FIG. 14 is a side elevation view of a beverage container having an infuser according to third embodiment.

Figure 15:
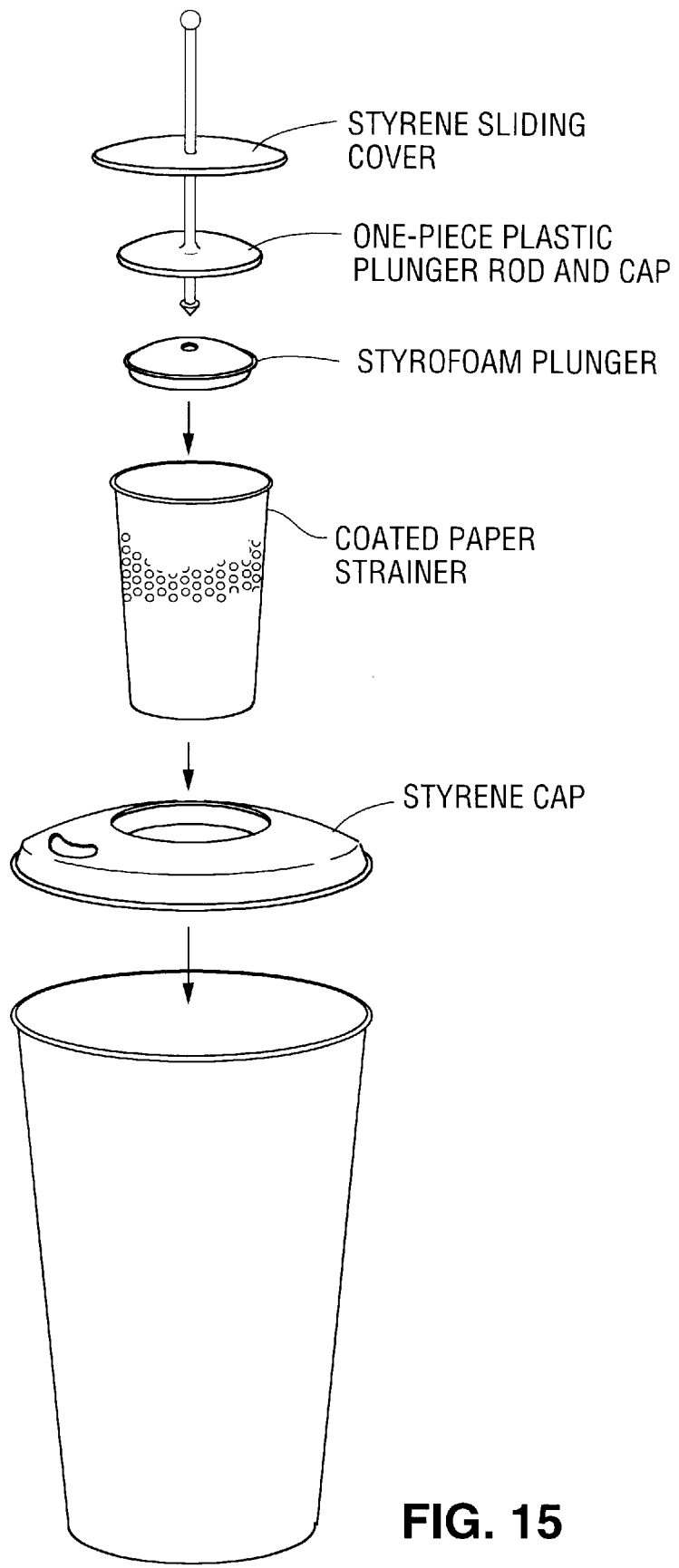
Figure 16:
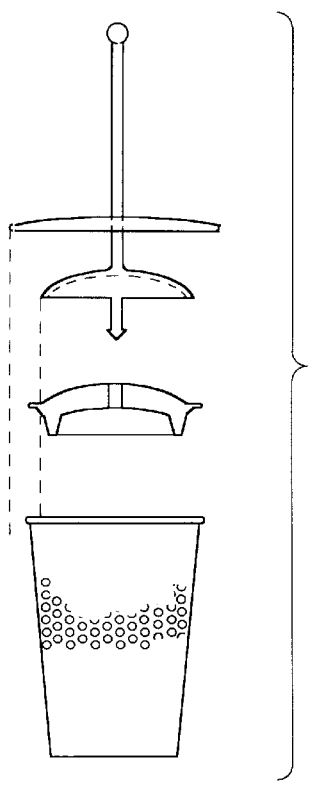
Figure 17:
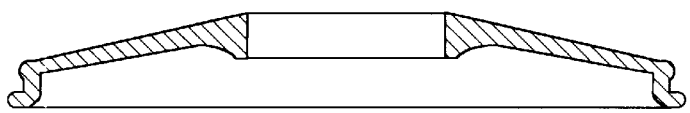

A fourth embodiment of a beverage infuser according to the present invention is shown in FIGS. 15–18, in which:

FIG. 15 is an exploded perspective view of a beverage container having an infuser according to the fourth embodiment;

FIG. 16 is an exploded side elevation view of the infuser of FIG. 15, with the plunger shown in cross-section;

FIG. 17 is a cross-sectional side view of the cap; and

Figure 18:
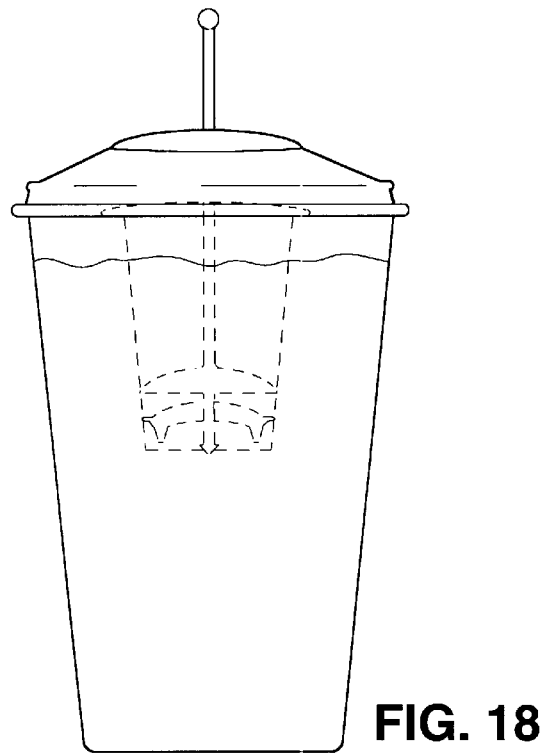

FIG. 18 is a side elevation view showing the infuser fully assembled with a cap and beverage container.

DESCRIPTION OF THE DRAWINGS

Figure 6:
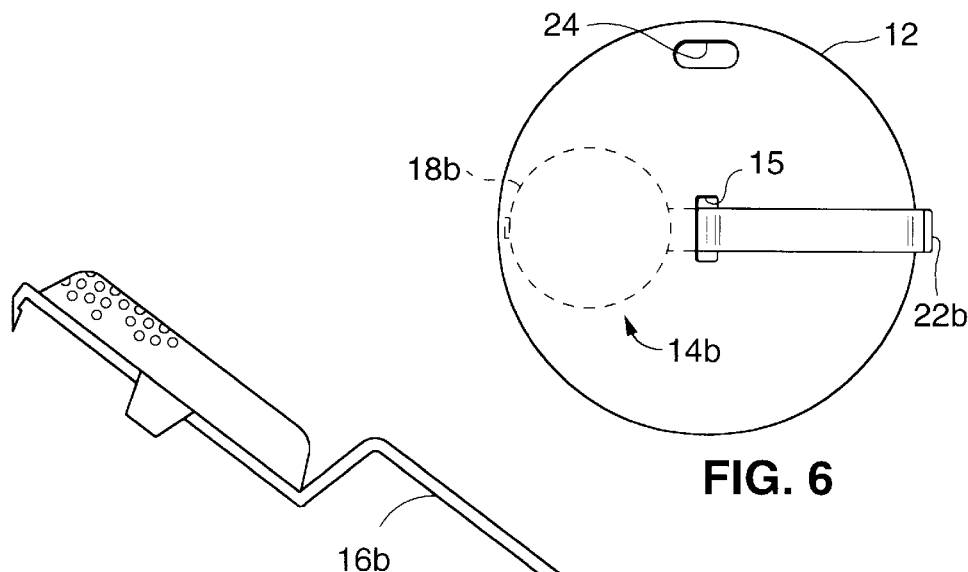
FIG. 6 is a top plan view of the strainer of FIG. 1 in combination with a cap and beverage container according to the present invention. The strainer basket is shown in the second position removed from the liquid in the beverage container.

Referring to FIGS. 1–5, a first embodiment of a beverage infuser according to the present invention includes a beverage cup 10, a cap 12 on the beverage cup 10, and a strainer assembly 14 which is suspended into the beverage cup 10 through an opening 15 (FIG. 6) in the cap 12.

The strainer assembly 14 includes a primary arm 16, a pair of secondary arms 17 and a strainer basket 18. The basket includes an upper section that is hinged to a lower section and that is moveable between an opened position (FIG. 2), which allows the basket to be filled with tea leaves, and a closed position (FIG. 1) in which the strainer basket is closed and locked by a friction latch 20 to contain the tea leaves inside. Strainer basket 18 is provided with a plurality of perforations sized to allow passage of liquid while preventing tea leaves from leaving the strainer through the perforations. Secondary arms 17 are adjacent, and preferably substantially parallel, to the primary arm 16. A nib 22 is formed at the end of the primary arm 16.

A drinking port 24 (FIG. 6) is formed in the cap 12 and allows the user to drink from the cup 10.

Use of the infuser according to the first embodiment will next be described.

Figure 1:
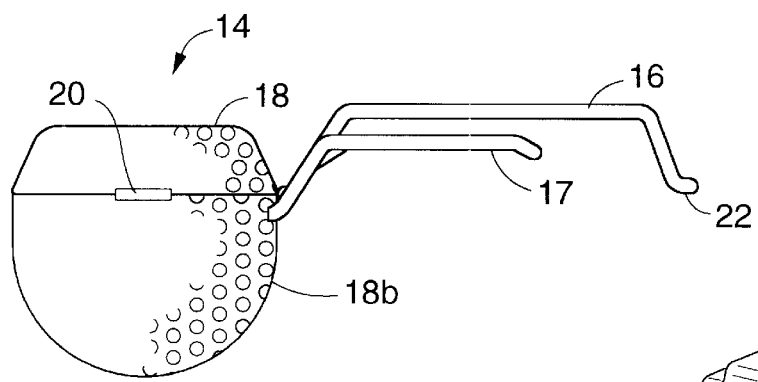
FIG. 1 is a side elevation view of a strainer assembly for use with the beverage infuser according to the first embodiment.
Figure 2:
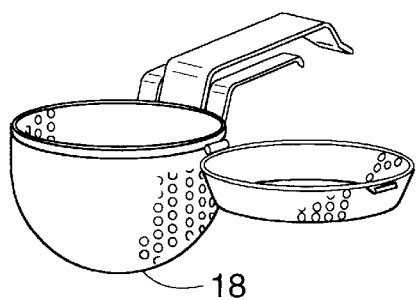
FIG. 2 is a perspective view of the strainer assembly of FIG. 1 showing the strainer basket in the opened position.
Figure 3:
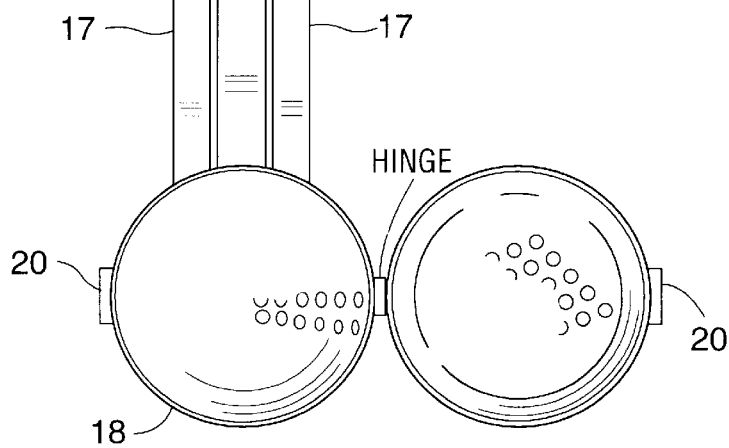
FIG. 3 is a top plan view of the strainer assembly of FIG. 1, also showing the strainer basket in the opened position.

First, the strainer basket 18 is opened to an opened position such as that shown in FIG. 2 by pivoting its upper section about the hinge. Loose tea leaves are placed in the basket 18 and the basket is closed. Next, the nib 22 is fed through opening 15 in the cap 12 from the bottom face of the cap 12, so that the cap and strainer assembly 14 are arranged as shown in FIG. 4.

Figure 4:
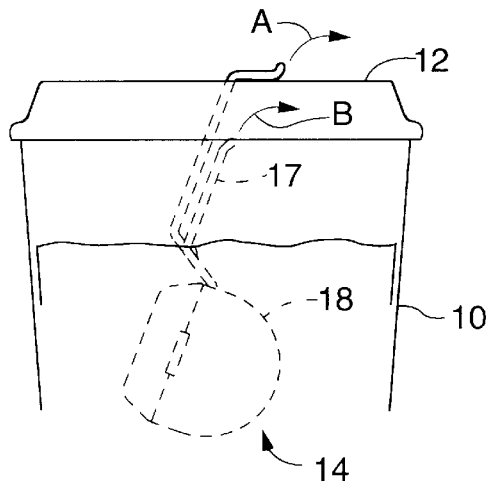
FIG. 4 is a side elevation view of the strainer assembly of FIG. 1 in combination with a cap and beverage container according to the present invention. The strainer basket is shown in a first position immersed within a liquid in the beverage container.
Figure 5:
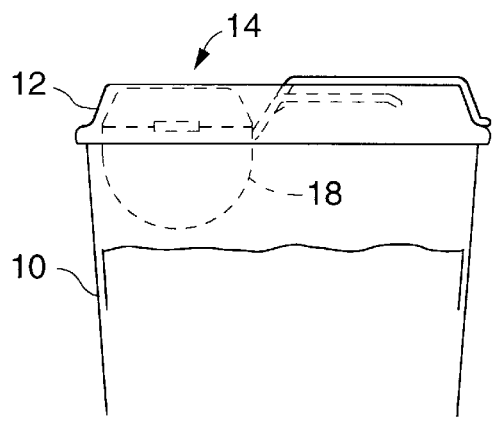
FIG. 5 is a side elevation view of the strainer of FIG. 1 in combination with a cap and beverage container according to the present invention. The strainer basket is shown in a second position removed from the liquid in the beverage container.

The styrene cap 12 is secured to a beverage cup 10 which has been filled with heated liquid as shown in FIG. 4. Once the tea has been allowed to steep in the liquid for a desired amount of time, the strainer basket 18 is pulled out of the liquid by pulling up on the nib 22 in the direction indicated by arrow A in FIG. 4.

As the arm 16 is pulled upwardly through the opening 15, the secondary arms 17 extends along the bottom surface of the cap 12 (see arrow B) while the arm 16 extends along the top surface of the cap. Once the arm has been withdrawn, the nib 22 is pressed downwardly along the circumferential edge of the cap 12, causing it to snap into engagement with the cap by friction and thus to prevent the strainer basket 18 from falling back into the liquid. The beverage may then be consumed through the drinking port 24.

The strainer assembly 14 may be proportioned for use with commercially available beverage container caps or it may be provided with a specially designed cap. It may be manufactured of styrene, wood pulp or other suitable materials. The cap, infuser and cup may be disposable or reusable.

A second embodiment of a beverage infuser according to the present invention is shown in FIGS. 7A through 8. The second embodiment differs from the first primarily in the mechanism for opening and closing the basket 18.

Referring to FIGS. 7A and 7B, the strainer assembly 14b of the second embodiment includes a hinged primary arm 16b and a strainer basket 18b. The arm and basket move between the opened position shown in FIG. 7B and the closed position shown in FIG. 7A. Secondary arm 17b is adjacent, and preferably substantially parallel, to the hinged arm 16b. Nib 22b is formed at the hinged end of the arm 16b.

During use of the beverage infuser according to the second embodiment, the strainer basket 18b is opened to the opened position (FIG. 7B) by pivoting arm 16b about the hinge at nib 22b. Loose tea leaves or coffee grounds are placed in the basket 18b and the basket is closed. Next, nib 22b is fed through opening 15 (as in FIG. 6) in the cap 12 from the bottom face of the cap 12 as with the first embodiment. The process continues in the manner described with respect to the first embodiment. When the arm 16b is pulled upwardly through the opening 15 after steeping, the secondary arm 17b extends along the bottom surface of the cap 12 while the primary arm 16b extends along the top surface of the cap. As with the first embodiment, the nib 22b is made to frictionally engage along the circumferential edge of the cap 12 to prevent the strainer basket 18b from falling back into the liquid.

Referring to FIG. 9, a beverage infuser according to the present invention includes a beverage cup 110, a cap 112 on the beverage cup 110, and a strainer 114 which is suspended into the beverage cup 110 through an opening 115 in the cap 112. A plunger assembly 116 is slidably positioned within the strainer 114.

Strainer 114 has an upper section that is provided with a plurality of perforations sized to allow passage of liquid while preventing tea leaves from leaving the strainer through the perforations. The strainer is preferably D-shaped in cross-section. It is also preferably tapered on its rounded side from top to bottom to facilitate stacking.

Plunger assembly 116 is slidable within the strainer 114. It should be appreciated that the plunger component of the invention may be configured in a number of ways. In one embodiment, plunger assembly 116 includes a plastic plunger rod 118 fixed to a plastic plunger cap 120 and a styrofoam plunger 122 carried by the plunger rod. When the invention is assembled, the plunger rod 118 extends through the plunger 1 22 and the plastic plunger cap 120 snaps by friction into a recessed area on the plunger 122. A ball 124 formed on the plunger rod 118 is positioned below the plunger 122 and prevents the rod from being withdrawn out of the styrofoam plunger 122. The plunger assembly 116 may alternatively be molded as a single piece with the rest of the cap 112 if materials are used which will not impart a taste to the beverage. The current embodiment is desirable in that the plastic plunger cap 120 gives rigidity to the plunger system but is insulated from the beverage by the styrofoam plunger 122 which will not impart taste to the beverage.

Plunger 122 includes a rolling edge seal 126 on its curved side (i.e., the curved portion of the "D" cross-section) designed to roll upwardly as the plunger assembly is advanced in the strainer 114 and to thereby seal against the interior of the strainer. The straight edge of the plunger 122 seals against the straight edge of the strainer due to the pressure exerted by the taper on the curved edge.

A cover 128 for the strainer 114 is slidably attached to the plunger rod 118 and is positionable on top of the cap 112 to prevent liquid from spilling from the cup through opening 115 in the cap. The cover preferably forms a friction lock with the area surrounding the opening 115 in the cap.

A drinking port 130 is formed in the cap 112 and allows the user to drink the beverage made using the infuser. The cap 112 also has a scored break-away section with a "finger-pull" molded in. This allows an opening to be formed in the cap 112 for adding sugar, milk, etc. without lifting the cover 128 and pulling out the strainer 112. The rim of the cap 112 is reinforced to stay on the cup when the break-away section is being pulled apart from the cap.

Use of the infuser according to the third embodiment will next be described.

First, the styrene cap 112 is secured to a beverage cup 110. A desired amount of loose leaf tea is placed in the strainer 114 and the strainer is positioned through the opening 115 in the styrene cap. The lip of the strainer rests on a corresponding surface surrounding the opening of the styrene cap.

Next, heated liquid is poured into the opened top of the strainer and allowed to steep. Once the tea has been allowed to steep for a desired amount of time, the plunger assembly 116 is lowered into the strainer, causing the plunger to confine the tea leaves in the lower, unperforated, portion of the strainer to prevent further steeping. The cover 128 engages with the styrene cap 112 to close the opening 115. A locking tip 132 may be provided at the bottom of the rod to engage with a corresponding recess 134 in the bottom of the beverage container to prevent the plunger rod from being subsequently withdrawn.

FIGS. 15 through 18 show a fourth embodiment that is similar in design and operation to the third embodiment.

Several embodiments utilizing principles of the present invention have been described herein. It should be appreciated that these embodiments are given for purposes of illustration only and are not intended to limit the scope of the invention.

I claim:

1. A method of preparing a coffee or tea drink, comprising the steps of:

provoking a cup, a cap attachable to the cup and having a drinking port, and a strainer basket attachable to the cap;

placing coffee grounds or tea leaves into the strainer basket;

attaching the strainer basket to the cap;

placing hot water in the cup;

securing the cap on the cup;

causing the strainer basket to be suspended within the hot water and thereby causing the tea leaves or coffee grounds to steep in the hot water to form a drink;

withdrawing the strainer basket towards the cap to a withdrawn position within the cup and engaging the strainer basket in the withdrawn position; and with the strainer basket in the withdrawn position, drinking the drink through the drinking port in the cap.

2. The method of claim 1, further comprising the step of:

providing an arm connected to the strainer basket, and an opening in the cap for receiving the arm;

during the step of causing the strainer basket to be suspended within the hot water, suspending the strainer basket from the cap by the arm, with a portion of the arm extending through the opening in the cap; and during the withdrawing step withdrawing a portion of the arm through the opening in the cap.

3. The method of claim 1, further comprising the step of:

providing to the strainer basket a door section moveable to an open position to permit introduction of coffee grounds or tea leaves into the basket, and to a closed position to prevent escape of the coffee grounds or tea leaves from the basket; and after the step of placing coffee grounds or tea leave into the strainer basket, moving the door section to closed position.

4. The method of claim 2 wherein the step of engaging the strainer basket in the withdrawn position includes engaging a portion of the arm with the cap.

5. The method of claim 4 wherein the cap includes a rim and wherein the step of engaging a portion of the arm with the cap includes forming a friction lock between the arm and the rim.

\* \* \* \* \*